(12) United States Patent
Saunders et al.

(10) Patent No.: US 6,654,896 B1
(45) Date of Patent: Nov. 25, 2003

(54) HANDLING OF MULTIPLE COMPLIANT AND NON-COMPLIANT WAKE-UP SOURCES IN A COMPUTER SYSTEM

(75) Inventors: Scott P. Saunders, Spring, TX (US); Robert E. Krancher, Houston, TX (US); Richard S. Lin, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/571,475

(22) Filed: May 16, 2000

(51) Int. Cl.[7] .............................. G06F 1/26; G06F 13/24
(52) U.S. Cl. ........................ 713/323; 713/300; 713/310; 710/260
(58) Field of Search ................................. 713/300, 310, 713/323, 324; 710/260

(56) References Cited

U.S. PATENT DOCUMENTS

| | | | | | |
|---|---|---|---|---|---|
| 5,905,908 A | * | 5/1999 | Wagner | ....................... | 370/401 |
| 5,938,771 A | * | 8/1999 | Williams et al. | ............ | 713/310 |
| 6,055,643 A | * | 4/2000 | Chaiken | ..................... | 713/323 |
| 6,092,207 A | * | 7/2000 | Kolinski et al. | ............. | 713/323 |
| 6,092,208 A | * | 7/2000 | Reneris | ....................... | 713/323 |
| 6,105,142 A | * | 8/2000 | Goff et al. | ................... | 713/324 |
| 6,308,278 B1 | * | 10/2001 | Khouli et al. | ................ | 713/323 |
| 6,349,386 B1 | * | 2/2002 | Chan | .......................... | 713/323 |
| 6,446,214 B2 | * | 9/2002 | Chrysanthakopoulos | .... | 713/310 |
| 6,477,655 B1 | * | 11/2002 | Delvaux et al. | ............ | 713/323 |

\* cited by examiner

Primary Examiner—Thomas Lee
Assistant Examiner—Chun Cao

(57) ABSTRACT

A system and method are disclosed for handling devices that assert a wake-up signal in an improper fashion. It is observed that any wake-up signals that remain asserted as the computer system enters a low-power mode are likely produced by non-compliant cards, and to assure proper functioning of the system, it is desirable for the computer system to selectively block assertion of asserted signals from non-compliant cards. In one embodiment the computer system includes an expansion bus coupled to a bus bridge, and a signal gate. The expansion bus includes a wake-up signal that the signal gate can be configured to isolate from the bus bridge. The signal gate is preferably controlled by the power management controller. The power management controller sets the signal gate to isolate the signal from the bus bridge if the controller determines that wake-up signal is being driven in a non-standard manner. The non-compliance may be determined by: (a) detecting a transition of the computer to a reduced power state; (b) pausing for a predetermined delay; and (c) sampling the wake-up signal to identify any asserted wake-up signals. In the presence of non-compliant expansion cards, the disclosed embodiments may advantageously assure correct operation of the system with minimal additional cost.

1 Claim, 2 Drawing Sheets

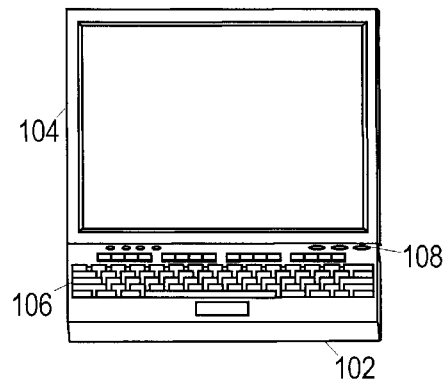
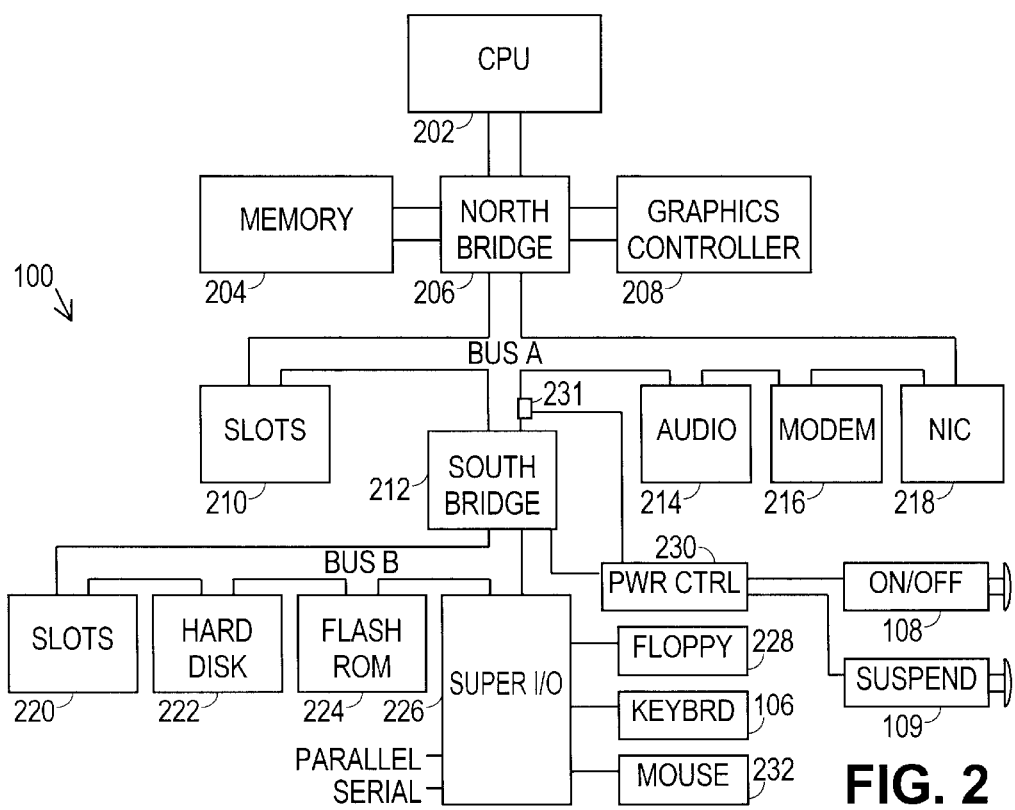

HANDLING OF MULTIPLE COMPLIANT AND NON-COMPLIANT WAKE-UP SOURCES IN A COMPUTER SYSTEM

BACKGROUND

The present invention relates generally to systems having an expansion bus configured to handle expansion cards designed to different versions of the expansion bus standard. More particularly, the it relates to a technique for selectively isolating "reserved" signals from expansion cards that treat those signals incorrectly.

Generally stated, the term "power management" refers to the ability of a computer system to conserve or otherwise manage the power that it consumes. Many personal computer systems conserve energy by operating in special low-power modes when the user is not actively using the system. Although used in desktop and portable systems alike, these reduced-power modes particularly benefit laptop and notebook computers by extending the battery life of these systems. Some computer systems automatically enter low-power mode when a user has not performed a certain action within a given period of time. The computer might power down the monitor if the video display has not recently changed, for example, or may power down the hard drive if the user has not recently opened or saved any files onto the hard disk. If the computer detects a period of inactivity, the computer may enter a "deep sleep" mode in which power is completely cut off to all but a few devices within the computer. In addition, the user often can initiate the sleep mode through a menu in the operating system (OS) or by pressing a power button on the computer. Typically the memory contents are preserved so that the computer returns to the same state that it was in when the sleep mode began.

There are many ways that have been used to implement an energy-conserving reduced-power mode. Examples include hard off (power is disconnected), soft off (power is supplied only to components which monitor activity external to the system), hibernated power state (contents of memory are stored on disk and current state of computer is preserved while power consumption is reduced to a minimum level), suspend mode (all central processor activities are halted, but power to memory is maintained and dynamic RAM is refreshed), and sleep mode (the clock signal is reduced or halted to some or all of the system components during periods of inactivity). The sleep and suspend modes may each be invoked at various levels, depending on the particular implementation of these modes, and recovery from these modes is implementation specific.

Although these reduced-power modes may render the computer temporarily or partially inoperable, the user can generally restore full-power, or "wake up" the computer, at any time. For example, the computer may automatically restore video power if the user moves the mouse or presses a key on the keyboard, or might power up the hard disk if the user attempts to open or save a file. The source of the triggering activity may come from a local mechanism (i.e. a switch or sensor of any kind such as a power switch, a reset switch, a pressable key, a pressure sensor, a mouse, a joystick, a touch pad, a microphone, or a motion sensor), or the trigger source may be remote. For example, some computers have the capability to wake automatically in response to incoming phone calls detected by a modem or to wakeup messages received over a local area network (LAN). Sleep mode is often an attractive alternative to completely shutting the computer down, because the computer consumes little power during sleep mode and because waking up from sleep mode typically is much faster than rebooting the system. Also, the ability to remotely awaken a computer increases its usability and maintainability. For example, a user can remotely retrieve files even when the computer was powered down, and a system administrator can perform system maintenance after hours without needing to physically visit each computer.

Early implementations of the various power modes required the computer hardware itself to monitor user activity and determine the proper power state for each device in the computer system. These early computer systems included a read only memory (ROM) device that stored a set of instructions for the computer to follow in order to carry out power management functions. The set of instructions formed part of the Basic Input/Output System (BIOS) of the computer, which also included instructions for procedures such as accessing data on a hard or floppy disk drive and controlling the graphics display. The ROM device containing the BIOS is referred to as the "BIOS ROM". Because hardware-based power management instructions usually are included in BIOS, such a management scheme is commonly known as "BIOS power management". Under BIOS power management, conditions within the computer system that initiate power state transitions, such as button presses and periods of inactivity explained above, generate system management interrupt (SMI) signals to the central processing unit (CPU). Upon receiving an SMI, the CPU executes the BIOS power management instructions stored in ROM to change the power state.

More recently, the Advanced Configuration and Power Interface (ACPI) specification, written collaboratively by Intel, Microsoft, and Toshiba, has introduced the concept of managing power functions using the computer' operating system software (e.g., Windows® 98 and Windows® NT). Centralizing power management within the operating system, in contrast with earlier hardware-based power management techniques, allows computer manufacturers to make simpler, less expensive hardware components that do not have to manage their own power states. Instead, these devices need only to respond to power management commands from the operating system. In general, operating system-based power management enables the computer system to implement relatively complex power management procedures that may have been difficult, if not impossible, to realize using a more decentralized, hardware-based approach. In fact, implementing power control through ACPI, instead of through traditional hardware methods, can significantly reduce the power consumption of some computer systems. Operating system-based power management also provides the user with some level of power management control.

Under ACPI, a computer system can be placed in one of six graduated reduced-power system states, which do not necessarily correspond (in functionality or in name) to the power down modes recited above. The six system power states, S0, S1, S2, S3, S4, and S5, which encompass varying levels of system activity ranging from fully operational (S0) to "soft off" (S5). Power states S1–S5 represent sleeping states, in which the computer system is neither fully operational nor completely powered off. The sleep states generally encompass varying levels of system activity (or "context") and require different lengths of time (or "wakeup latencies") to return to fill power. Because sleep state S5 represents the deepest sleep state, it may also be referred to equivalently as the "off" state or as the lowest-power state.

Transitioning between the system power states generally requires cooperation between the operating system and the computer hardware. The computer provides a set of ACPI registers which the operating system can access. To transition to one of the sleep modes from full-power mode (S0), the operating system stores special sleep codes into a pair of ACPI control registers. The sleep code includes a sleep enable bit and three sleep-type bits. The sleep-type bits generally identify one of the power states S1–S5. Upon detecting that the operating system has set (or "asserted") the sleep enable bit, the computer places itself into a sleep mode as defined by the sleep-type bits.

As stated above, the operating system may direct the hardware to place itself into a sleep mode for a variety of reasons. For example, the computer hardware may provide a timer that expires after a predetermined time of inactivity within the system, prompting the operating system to place a sleep request into the sleep-type and sleep enable bits of the control register. Alternatively, the operating system may write a sleep request to the control register after detecting that the user has initiated a sleep mode through the software interface, pressed sleep button on the computer chassis, or simply closed the computer screen (e.g., on a laptop computer). When the sleep enable bit of the control register is asserted, the computer system places itself into the low-power mode indicated by the value of the sleep-type bits.

The ACPI protocol also includes a status register to enable system wakeup. The status register includes a wake status bit. The wake status bit typically is set if the user presses a wakeup button or power button on the computer. Certain devices in the computer system, such as the modem or network interface card (NIC), also may cause the wake status bit to be set in response to incoming messages (e.g., phone rings or network "wakeup" messages). When the operating system detects that the wake status bit has been set, the operating system transitions computer operation to the S0 mode.

To accommodate the evolving power management technology, the Peripheral Component Interconnect (PCI) bus specification has been revised to designate one of the previously reserved card connector pins as a Power Management Event (PME#) signal. Asserting the PME# signal (by driving it low) sets the wake status bit in the ACPI status register (in ACPI-compliant systems) or otherwise initiates the wake-up process of the computer.

Although the correct way to treat a reserved pin is to leave it as a no-connection (NC) pin, many manufacturers have grounded the reserved pins as a matter of course. With the revision to the specification, the PCI devices made by such manufacturers cause the PME# signal to be constantly asserted. In some systems, these non-compliant devices prevent the system from shutting down when the power management functions are enabled. In other systems the conflict between the shutdown and wake-up commands may cause the system to cycle between states or get caught in an intermediate state (i.e. "lock-up").

SUMMARY OF THE INVENTION

The problems described above are at least in part addressed by a system and method for handling devices that assert a wake-up signal in an improper fashion. It is observed that any wake-up signals that remain asserted as the computer system enters a low-power mode are likely produced by non-compliant cards, and to assure proper functioning of the system, it is desirable for the computer system to selectively block assertion of asserted signals from non-compliant cards. In one embodiment the computer system includes an expansion bus coupled to a bus bridge, and a signal gate. The expansion bus includes a wake-up signal that the signal gate can be configured to isolate from the bus bridge. The signal gate is preferably controlled by the power management controller. The power management controller sets the signal gate to isolate the signal from the bus bridge if the controller determines that wake-up signal is being driven in a non-standard manner. The non-compliance may be determined by: (a) detecting a transition of the computer to a reduced power state; (b) pausing for a predetermined delay; and (c) sampling the wake-up signal to identify any asserted wake-up signals. In the presence of non-compliant expansion cards, the disclosed embodiments may advantageously assure correct operation of the system with minimal additional cost.

DESCRIPTION OF THE DRAWINGS

A better understanding of the present invention can be obtained when the following detailed description of the preferred embodiment is considered in conjunct ion with the following drawings, in which:

FIG. 1 is a representative computer system;

FIG. 2 is a functional block diagram of the representative computer system;

Figure 3:
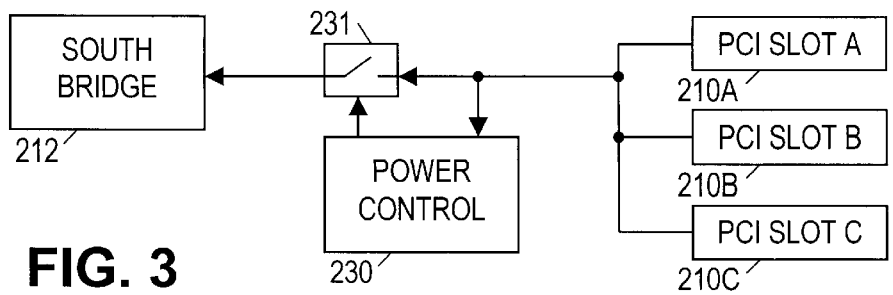
FIG. 3 is a functional block diagram of a first embodiment of the wake-up signal gate.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

FIGS. 1 and 2 show a representative computer system 100 configured to handle non-compliant expansion cards. Computer system 100 comprises a chassis 102 connected to a display 104. A keyboard 106 or other user input device is provided to allow the user to control the computer system once it has been turned on or awakened by actuation of a power button 108. Internally, the computer 100 generally includes a central processor unit (CPU) 202, a main memory array 204, and a bridge logic device 206 coupling the CPU 202 to the main memory 204. The bridge logic device is sometimes referred to as a "North bridge" for no other reason than it often is depicted at the upper end of a computer system drawing. The North bridge 206 couples the CPU 202 and memory 204 to various peripheral devices in the system through a primary expansion bus (Bus A) such as a Peripheral Component Interconnect (PCI) bus, an Extended Industry Standard Architecture (EISA) bus, or some other suitable bus. For clarity in the ensuing discussion, it will be assumed that primary expansion bus is a PCI bus, but no such limitation to the scope of the claims is implied. Publications that describe the PCI bus include the

*PCI Specification*, Rev. 2.2, and *Power Management Specification* 1.1, all published by the PCI Special Interest Group. The principles taught in these documents are well known to those of ordinary skill in the art and are herein incorporated by reference.

The North bridge logic also may provide an interface to an Accelerated Graphics Port (AGP) that supports a graphics controller 208 for driving the video display 104. If the computer system 100 does not include an AGP, the graphics controller 208 may reside on the primary expansion bus.

Various peripheral devices that implement the Bus A protocol may reside on Bus A. For example, an audio card 214, a modem 216, and network interface card (NIC) 218 are shown coupled to Bus A in FIG. 2. The audio card 214 allows for the generation of sounds via speakers (not shown), the modem 216 generally allows the computer to communicate with other computers over a telephone line, an Integrated Services Digital Network (ISDN), or a cable television connection, and the NIC 218 permits communication between computers over a local area network (LAN) (e.g., an Ethernet network). These components may be integrated into the motherboard or they may be plugged into expansion slots 210 that are connected to Bus A.

If other, secondary expansion buses are provided in the computer system, as is typically the case, each secondary expansion bus (Bus B) is coupled to the primary expansion bus (Bus A) by another bridge logic device 212. This bridge logic 212 is sometimes referred to as a "South bridge," reflecting its location vis-à-vis the North bridge 206 in a typical computer system drawing. An example of such bridge logic is described in U.S. Pat. No. 5,634,073, assigned to Compaq Computer Corporation. Various components that understand the bus protocol of Bus B may reside on this bus, such as hard disk controller 222, Flash ROM 224, and Super I/O controller 226. Slots 220 may also be provided for plug-in components that comply with the protocol of Bus B.

Flash ROM 224 stores the system BIOS that is executed by CPU 202 during system initialization. The Super Input/Output (Super I/O) controller 226 typically interfaces to input/output devices such as a keyboard 106, a mouse 232, a floppy disk drive 228, a parallel port, and a serial port. Super I/O controller 226 also includes a battery-backed real time clock (RTC) and configuration memory (CMOS).

South bridge 212 often includes additional logic such as an interrupt controller, timers, and a power management controller 230 (shown separately). The counter/timer may be used to track the activities of certain components such as the hard disk 222 and traffic on the primary expansion bus, and induce a sleep mode or reduced power mode after a predetermined time of inactivity. The power management controller handles the power management functions, e.g., reducing or terminating power to various system components such as the disk drives 222, 228, and blocking the clock signals that drive components such as the CPU 202 and the bridge devices 206, 212 thereby inducing a sleep mode in the expansion buses. Depending on the implementation of the power management functionality, the South bridge 212 may assert a System Management Interrupt (SMI) to cause the operating system to initiate a power mode transition or simply to alert the operating system of an impending transition. The user can trigger the power mode transition by pressing a power button 108 or a suspend switch 109.

Particular to the present invention is a signal gate 231 controlled by power management controller 230. In many systems, various devices such as modem 216 or NIC 218 can awaken the computer system 100 in response to a ring signal or a wake-up packet, for example. Upon detecting any such trigger, the device asserts a wake-up signal (such as the PME# signal on the PCI bus) to the South bridge 212. Power management controller 230 can operate the gate to prevent the assertion of the wake-up signal from reaching the South bridge and causing the South bridge to initiate a system wake-up. The signal gate 231 can be used to selectively or collectively disable the ability of wake-up enabled devices to initiate a system wake-up. This gate is particularly useful for preventing non-compliant devices from interfering with the operation of the system.

FIG. 3 illustrates the operation of one embodiment of signal gate 231. Slots 210A through 210C are coupled via the primary expansion bus to South bridge 212. One of the primary expansion bus signals is a wake-up signal that is coupled to the power management controller 230 and is coupled to the South bridge 212 via signal gate 231. The power management controller 230 controls the signal gate 231 collectively isolate the wake-up signals from devices in slots 210A through 210C if a non-compliant device is detected. One of skill in the art will recognize that there are a multitude number of ways in which the signal gate 231 can be implemented, so long as it can be set to block or pass the received signal, and it can be in effect "fixed" in a selected state that persists even when power is removed from the system.

Figure 4:
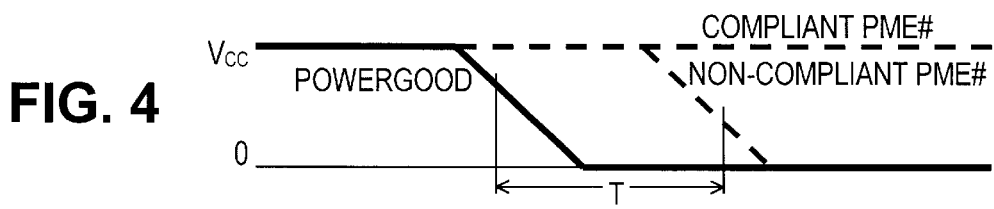
FIG. 4 is a graph illustrating the method for detecting non-compliant devices.

FIG. 4 illustrates the method used by the power management controller 230 to detect a non-compliant device. Nearly all modem computer systems today have a "Power Good" signal that indicates to the various computer components when it is safe to begin operating after power is applied. The Power Good signal is asserted (high) once all the power rails in the system have stabilized at their nominal voltages. As a system is powered off or transitioned into a "deep sleep" mode, power is shut off to various portions of the system and the Power Good signal falls to ground. Those devices that are not true wake-up devices will lose power, and their output signals will fall to ground at the same time as or shortly after the Power Good signal. Thus, if a device is driving the wake-up signal in a non-compliant fashion, the wake-up signal will be become or remain low (the PME# signal is asserted when low) no later than some predetermined delay T after the Power Good signal becomes de-asserted. On the other hand, if the wake-up signal remains high, then at the very least no device is continually asserting the wake-up signal due to non-compliance with the standard.

The power management controller 230 monitors the relationship between the Power Good signal and the wake-up signal, and sets signal gate 231 to block the wake-up signal if non-compliance is detected. The signal gate 231 is non-volatile and retains its setting. In a preferred embodiment, the signal gate can be reset by the power management controller 230. The power management controller may reset the signal gate if it detects the wake-up signal is high at the predetermined delay T after the Power Good signal falls. To monitor the relationship between the signals, the power management controller 230 may simply wait for the predetermined delay after the Power Good signal falls, and then sample the wake-up signal. The power management controller then sets the signal gate 231 accordingly.

Depending on the delay T, one false wake-up event may occur before the signal gate is set appropriately. It is expected that the natural reaction of users will be to "try again" rather than seek the assistance of technical support. Since the subsequent attempt to power down will occur correctly, it is expected that this solution will be effective, and will not deprive users of the use of the non-compliant card.

Figure 5:
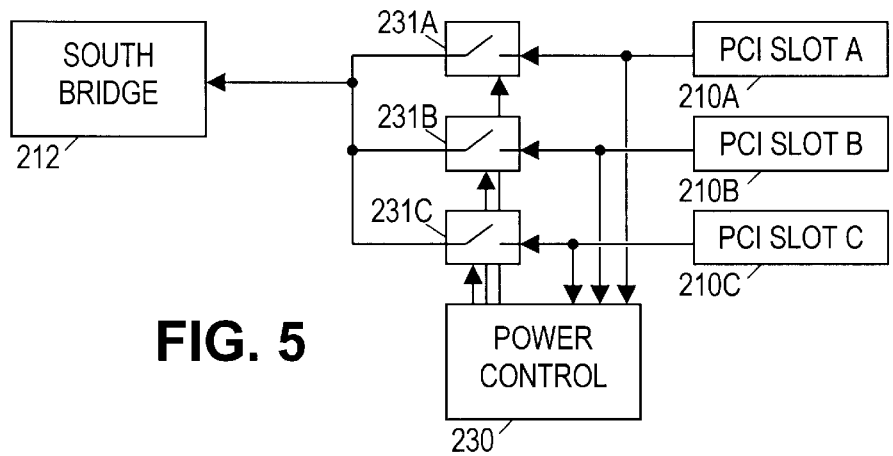
FIG. 5 is a functional block diagram of a second embodiment of the wake-up signal gate.

While effective, the embodiment of FIG. 3 will deprive users of the correct operation of compliant wake-up devices when a non-compliant device is present in the system. The embodiment of FIG. 5 resolves this problem by providing a dedicated signal gate 231A–C for each slot 210A–C. The power management controller 230 samples each wake-up signal after the power good signal falls and sets the corresponding signal gates appropriately.

Figure 6:
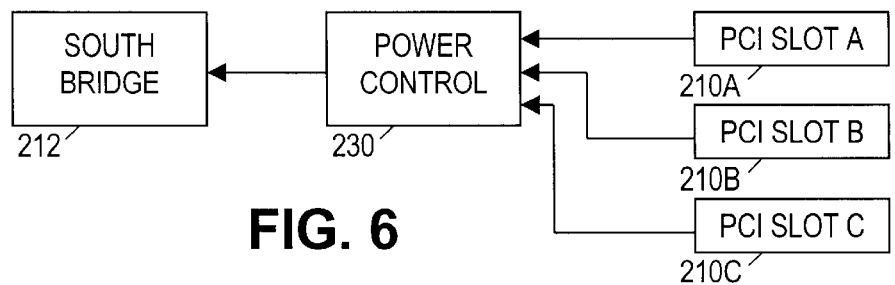
FIG. 6 is a function block diagram of a third embodiment of the wake-up signal gate.

Yet another embodiment is shown in FIG. 6. Whenever the Power Good signal is low in this embodiment, the power management controller 230 constantly monitors the individual wake-up signals from the slots 210A–C and responsively generates the wake-up signal. In addition to isolating only the non-compliant wake-up signals, this implementation advantageously avoids the possibility of that first false wake-up event.

It is noted that the present invention may be used with a laptop computer, desktop system, computer workstation, server, handheld computer, or any other device having power management functions that may be inadvertently invoked by a non-compliant component. In addition to the bus architectures disclosed, the present invention may be used with other bus architectures (e.g. IEEE 1394, Universal Serial Bus (USB), IDE) as desired.

The above discussion is meant to be illustrative of the principles of the present invention. Numerous variations and modifications will become apparent to those skilled in the art once the above disclosure is fully appreciated. It is intended that the following claims be interpreted to embrace all such variations and modifications.

What is claimed is:

1. A computer system that comprises:

a user input device;

a computer chassis that contains at least:
- a system memory configured to store an operating system;
- a central processor coupled to the memory and configured to execute the operating system;
- an expansion bus that couples the user input device to the central processor; and
- a bus bridge coupled to the expansion bus, wherein the bus bridge includes:
  - a power management controller coupled to the expansion bus and configured to receive a wake-up signal from a device resident on the expansion bus, wherein the power management controller isolates the wake-up signal from the bus bridge device if the device drives the wake-up signal in a non-compliant manner, wherein the wake-up signal is a power management event (PME#) signal, and wherein the controller isolates the PME# signal from the bus bridge if the PME# signal is low following a predetermined delay after a Power Good signal is de-asserted; and
- a signal gate that couples the wake-up signal to the bus bridge, wherein the signal gate is set to a "pass" state by the controller if the PME# signal is high after a predetermined delay following the de-assertion of the Power Good signal, and wherein the signal gate is set by the controller to a "no-pass" state otherwise.

* * * * *